US009077229B2

(12) United States Patent
Vedy (10) Patent No.: US 9,077,229 B2
(45) Date of Patent: Jul. 7, 2015

(54) INSTALLATION OF A RESOLVER IN A ROTATING ELECTRICAL MACHINE

(75) Inventor: Bertrand Vedy, Clermont-Ferrand Cedex (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 31 days.

(21) Appl. No.: 13/812,297

(22) PCT Filed: Jul. 27, 2011

(86) PCT No.: PCT/EP2011/062909
§ 371 (c)(1),
(2), (4) Date: Mar. 6, 2013

(87) PCT Pub. No.: WO2012/013705
PCT Pub. Date: Feb. 2, 2012

(65) Prior Publication Data
US 2013/0162113 A1  Jun. 27, 2013

(30) Foreign Application Priority Data
Jul. 30, 2010 (FR) ..................... 10 56328

(51) Int. Cl.
H02K 11/00 (2006.01)
H02K 15/16 (2006.01)
H02K 24/00 (2006.01)
(52) U.S. Cl.
CPC ............ *H02K 11/0031* (2013.01); *H02K 15/16* (2013.01); *H02K 24/00* (2013.01)

(58) Field of Classification Search
CPC .......................................... H02K 1/04
USPC ............................. 310/68 B, 68 R, 68 E, 77
See application file for complete search history.

(56) References Cited

U.S. PATENT DOCUMENTS

| 6,462,442 | B1 * | 10/2002 | Braun et al. ............... 310/68 B |
| 7,138,742 | B2 * | 11/2006 | Arimitsu et al. ....... 310/216.057 |
| 7,453,175 | B2 * | 11/2008 | Nakanishi et al. .......... 310/68 B |
| 2004/0174162 | A1 * | 9/2004 | Kuwahara ............... 324/207.25 |

(Continued)

FOREIGN PATENT DOCUMENTS

DE    10 2006 017 005 A1    10/2006
WO    WO 2010/026159 A1     3/2010

*Primary Examiner* — Naishadh Desai
(74) *Attorney, Agent, or Firm* — Fitzpatrick, Cella, Harper & Scinto (57) ABSTRACT

A rotating electrical machine includes a rotation shaft rotatably installed in a bearing that includes a portion secured onto the shaft and a portion removably attached to a supporting surface connected to a casing. The supporting surface includes an axial abutment for the bearing and a passageway traversed by the shaft. A resolver of the machine includes a resolver stator connected to the casing, and a resolver rotor having a diameter less than that of the passageway. The resolver rotor is attached to the shaft on an opposite side of a drive rotor relative to the bearing. A longitudinal position of parts installed on the shaft is determined such that, during installation, a transverse face of the bearing reaches an entrance of a cavity of the resolver stator before a transverse end of an external radial wall of the resolver rotor of the resolver reaches the entrance of the cavity.

4 Claims, 3 Drawing Sheets (56) References Cited

U.S. PATENT DOCUMENTS

| | | | |
|---|---|---|---|
| 2006/0226719 A1 | 10/2006 | Nakanishi et al. | 310/68 B |
| 2006/0232147 A1* | 10/2006 | Cheng | 310/52 |
| 2006/0250044 A1 | 11/2006 | Yokota et al. | 310/261 |
| 2007/0205679 A1 | 9/2007 | Terauchi et al. | 310/71 |
| 2011/0221290 A1 | 9/2011 | Vedy | 310/71 |
| 2011/0227428 A1 | 9/2011 | Vedy et al. | 310/43 |
| 2011/0241498 A1 | 10/2011 | Vedy | 310/68 B |

* cited by examiner

INSTALLATION OF A RESOLVER IN A ROTATING ELECTRICAL MACHINE

FIELD OF THE INVENTION

The present invention relates to rotating electrical machines. It relates notably to the machines that are capable of applying high powers in a compact format for the purpose of applications in the transport field, such as motor vehicles for example, in order to provide the traction but also optionally the braking of the vehicles that are fitted therewith.

DESCRIPTION OF THE PRIOR ART

Proposals for electric vehicles have multiplied in recent years. Electrical machines have appeared of which the power can reach for example 20, or even 30 kW in a space requirement that is compatible with the inside of a vehicle wheel or its immediate environment in the case of a vehicle comprising an electrical machine for each wheel. Because of the considerable electrical power applied by these machines in a restricted space, the arrangement of the functional members such as the stator, the rotor and the accessory elements necessary to the control of the machine inside the carcass remains an essential preoccupation for the designers.

According to a known manufacturing method, an electrical machine that is well suited to the new applications in motor vehicles comprises a stator housed in a casing or a jacket comprising a sleeve such that the terminal portions of the latter extend axially towards the outside beyond the ends of the stator magnetic circuit that constitutes the active portion of the stator. This magnetic circuit consists of electrical conductors housed in notches that form windings of which the ends are electrically connected to an appropriate connector or connection box. The electrical connection between the windings and with the outside makes it possible, depending on the case, either to produce a traction torque on the rotor and operate as a motor for driving the vehicle wheels when the circuit of these windings is connected to a three-phase AC power supply, or to produce three-phase electrical energy if the windings of the machine are connected to allow it to operate as a generator in the braking phases.

In order to make it possible to control the operation of the machine precisely, it is routine practice to fit it with a resolver which at every instant supplies the angular position of the rotor relative to the corresponding stator. The resolver comprises a rotor installed on the shaft of the machine in order to rotate in a resolver stator inside the machine casing. The shaft of the electrical machine drives by rotating the resolver rotor and the associated stator produces an AC electrical signal of which the phase characteristics faithfully and instantaneously reflect the changes of angular position of the machine rotor. In an automatically controlled electrical machine, this signal is used to slave the current in the windings of the stator to the maintenance of an optimum angular spacing (typically in quadrature) between the magnetic field rotating in the stator and the magnetic field generated between the poles of the rotor.

According to an embodiment described for example in International Patent Application No. WO 2010026159, the machine shaft is mounted on two rotation bearings in the casing of the machine. A first bearing is attached on one side of the machine stator in the centre of a flange at a first end of the casing. On the other side of the stator, a second flange is attached to the casing, which supports a second bearing traversed by an extension of the machine shaft. The resolver rotor is installed on this extension and rotates inside the resolver stator itself attached inside the machine casing. In the embodiment described by the aforementioned document, the second flange comprises a supporting surface for the second bearing. From this supporting surface, it extends inside the casing via a hollow wall inside which the stator of the resolver is housed with its associated rotor. On its periphery, this wall is attached to the second end of the machine casing.

In the machine of the document mentioned above, the housing of the resolver in the said hollow wall is normally closed by a cover which axially immobilises the stator of the resolver in the internal axial direction against an annular abutment around the supporting surface for the installation of the second bearing of the machine shaft in the second flange. The internal diameter of this annular abutment is greater than the external diameter of the resolver rotor so as to make it possible, if required, to extract the resolver rotor from its stator by moving it in the axial direction towards the inside of the stator of the machine, through the opening formed in this annular abutment. This arrangement therefore makes it possible, provided that there is a convenient arrangement of the various rotating parts installed along the machine shaft, to remove the movable equipment formed by the machine shaft and the parts that it supports by sliding the said shaft through the stator of the machine and an aperture is cleared in the first end of the casing by the removal of the first flange supporting the first bearing.

The resolver can be installed in the machine after the first installation of the machine shaft in the casing, an operation during which the extension of the shaft designed to support the resolver rotor has been engaged, through a passageway in the second bearing of the machine shaft, in the housing of the resolver. The resolver rotor is engaged on the said shaft extension and then the resolver stator is installed and immobilised axially as has been said above. It then remains to carry out the adjustment or angular securing of the stator and of the rotor relative to one another and to the machine shaft as a function of the signals produced by the stator of the machine during the rotation of the shaft. There are several techniques for this purpose.

In the arrangement described by the aforementioned international patent application, the attachment of the resolver rotor to the machine shaft is carried out with the aid of a friction ring which allows the installer the option of modifying the angular position of the rotor on the shaft by applying an appropriate rotary torque thereto to overcome the resistance of the friction ring while the rigidity of friction of the latter is sufficient to prevent any untoward maladjustment of the rotor, irrespective of the torques to which it may be subjected in normal operation. For its part, the stator is attached once and for all in its position inside the casing. There are other methods of adjusting or calibrating the resolver in which the rotor is secured in a given fixed angular position on the machine shaft and it is the angular position of the stator which, at the end of installation of the resolver, is adjusted by a rotary movement until the desired signal level is obtained at the output of the stator windings. The position of the stator is then fixed by a clamping system preventing it from rotating in normal operation. Embodiments of devices for the angular adjustment of the position of a resolver are for example described in Patent Application US 2006/226719 of 12 Oct. 2006.

The arrangement that has just been recalled, concerning the aforementioned international patent application, for the installation of a resolver in an electrical machine, is worthwhile because it makes it possible easily and simply to remove and reinstall the moving portions of the machine after it has been installed and set in operation. Specifically, once the resolver rotor is in place at the end of the machine shaft, it is sufficient to remove the first flange to release the aperture to the first end of the casing and longitudinally slide the equipment formed by the machine shaft with all the parts that are attached thereto or otherwise installed in order to take them out of the machine casing through this aperture. The reinstallation is carried out in the reverse direction. A new adjustment of the resolver is not necessary after the reinstallation before the machine is returned to operation.

Experience has however occasionally revealed a difficulty during the reinstallation, because of the number of parts of the movable equipment formed by the shaft that must be associated with their counterparts in the fixed portions of the machine. In particular, the precise centring of certain movable portions relative to the corresponding static portions in the casing can be very awkward. In these conditions, the reinstallation may require more time than would be desirable before the machine shaft and the other parts are present in positions that are favourable to their complete insertion in operational position with their fixed counterparts. There may also be a risk of damaging certain parts during the handling and trial and error necessary for the centring and alignment operations.

DESCRIPTION OF THE INVENTION

Faced with this difficulty, an effort has been made to arrange, according to the invention, the disposition of the parts installed on the shaft of an electrical machine and of the fixed parts that match them in the casing of the machine in order to allow the simplified removal and reassembly of these parts, while minimising the difficulties of reciprocal adjustment of the said parts when the rotor shaft is inserted into the machine casing.

Accordingly, the subject of the invention is a rotating electrical machine comprising a casing; a machine stator attached to the casing; a machine rotor in the machine stator on a shaft, the said shaft defining a rotation axis of the machine, the said shaft being mounted, on one side of the said rotor, in a rotation bearing secured axially on the shaft and centred in a supporting surface connected to the casing in which the rotor can be inserted into the casing by a relative movement between the stator and rotor parallel to the axis of the machine; an internal passageway, in the casing, traversed by an extension of the said shaft beyond the said rotation bearing; and a resolver comprising a resolver rotor of which the external diameter is smaller than that of the said internal passageway, which is attached to the said extension of the machine shaft and is suitable for being inserted into the cavity of a resolver stator during the said relative movement, in order to constitute therein a resolver air gap between the radial walls facing the said resolver rotor and stator. According to the invention, the said machine is characterized in that the distance D1, measured along the axis of the shaft, between the positions (i) of the engagement point of the external radial wall of the rotation bearing, with the corresponding supporting surface in the casing, that is the most advanced towards the free end of the said extension, on the one hand, and (ii) of the point or ridge of the sector of maximum diameter in the external radial wall of the resolver rotor, that is the most advanced towards the free end of the said extension, on the other hand, is less than the distance D2, measured axially in the casing, between the positions (i) of the engagement point of the internal radial wall of the said supporting surface, with the external radial wall of the rotation bearing that is the most advanced in the direction of the said machine stator, on the one hand, and (ii) of the point or ridge of the sector of minimum diameter, in the internal radial wall of the resolver stator that is the most advanced, in the direction of the said machine stator, on the other hand.

By virtue of this arrangement, when installing or reinstalling, the machine shaft enters the casing longitudinally by moving with it the parts to which it is secured, notably the rotation bearing and the resolver rotor, the axial position of the shaft that corresponds to the engagement of the rotation bearing in the corresponding supporting surface can be offset, and specifically advanced on the machine stator side, relative to that which corresponds to the beginning of the engagement of the resolver rotor in the resolver stator. The arrangement therefore makes it possible to centre the shaft relative to the casing in order to obtain an engagement without damage and an effortless sliding of the wall of the bearing into the corresponding supporting surface before the position of the shaft reaches that which corresponds to an engagement of another part connected to the shaft in another part connected to the casing.

During the assembly or the reassembly of such an electrical machine, the machine rotor is pulled longitudinally by the machine shaft inside the stator until it occupies a portion of the internal space of the latter and while the rotation bearing situated on the side of the resolver and the resolver rotor, which are spread along the machine shaft, come closer respectively to the counterpart parts in the casing of the machine, namely the supporting surface of the bearing and the resolver stator. Then, the machine shaft continuing its longitudinal travel, the rotation bearing will come into contact with the corresponding supporting surface in the casing and will be engaged in the latter. The extension of the machine shaft beyond the rotation bearing, which carries at its end the resolver rotor, traverses with the latter a passageway in the casing which emerges onto a space in which the resolver stator is housed. By virtue of the construction rule expressed in the definition of the invention described above, by the relation between the distances D1 and D2, the engagement of the rotation bearing in its supporting surface of the bearing occurs before the resolver rotor reaches the level of the resolver stator. In particular, the difference between the distances D1 and D2 is chosen such that the rotation bearing is sufficiently engaged in the corresponding supporting surface for the machine shaft to be able to be perfectly centred in the casing despite the clearance that inevitably exists between the radial walls facing the rotor and the machine stator, before the shaft reaches a longitudinal position in which a second pair of male-female functional parts, for example the resolver rotor and stator, reaches the reciprocal engagement position.

The presence of the air gap of the machine implies the existence of a radial clearance between these two walls. It can therefore be understood that when the machine rotor begins to enter the stator at the beginning of installation or reinstallation, as has been indicated above, the clearance of these two parts does not naturally guarantee perfect centring of the rotor shaft. This is all the more the case when, in most rotating electrical machines of the type mentioned above and notably machines controlled with the aid of a resolver, the radial walls facing the stator and the rotor sustain magnetic forces, even at rest, which tend to normally oppose the small movements required to correctly centre the rotor inside the stator. With the sizing according to the invention, the operator is therefore sure to be able to use the means for centring the rotation bearing without having to concern himself, at this stage of the entry of the shaft in the casing, with assembling other counterpart functional parts and can subsequently benefit from the centring obtained to allow the other assembly(ies) of counterpart parts without difficulty when continuing the movement of the shaft.

According to a preferred embodiment, the rotating electrical machine according to the invention also comprises a centring interface between the rotation bearing of the machine shaft and the corresponding supporting surface in the casing, in which the external radial wall of the bearing, on the side of the free end of the shaft extension, has a first sector suitable for coming into contact with a second sector in the internal radial wall of the supporting surface of the rotation bearing on the side of the machine stator in the casing and at least one of the said first and second sectors is profiled with a diameter that decreases axially in the longitudinal direction going from the machine to the resolver.

By virtue of this arrangement, when the rotation bearing comes into contact with the bearing supporting surface due to the movement of the shaft, two surfaces, of which one is capable of sliding on the other like a cam, act on the ends in contact of the bearing and of the supporting surface in order to force the shaft to be centred against the magnetic forces exerted between the rotor and the stator until a portion of the external radial wall of the bearing has entered the internal radial surface of the bearing supporting surface over a sufficient distance for the shaft to be centred for the remainder of its longitudinal movement.

According to one advantageous embodiment, in the second sector, the internal radial wall of the supporting surface of the rotation bearing has a diameter that decreases axially in the longitudinal direction from the machine to the resolver.

Finally, according to one embodiment of the invention, the space that is internal to the said supporting surface of the rotation bearing in the casing is limited axially on the side opposite to the machine stator by an abutment that is crown-shaped around the said passageway traversed by the machine shaft, of which the internal diameter is greater than the external diameter of the resolver rotor but less than the diameter of the external radial wall of the rotation bearing.

BRIEF DESCRIPTION OF THE FIGURES

Other features and advantages of the invention will emerge from the following description of one or more embodiments given as being non-limiting, made with reference to the appended drawings in which.

DESCRIPTION OF ONE OR MORE EXEMPLARY EMBODIMENTS

Figure 1:
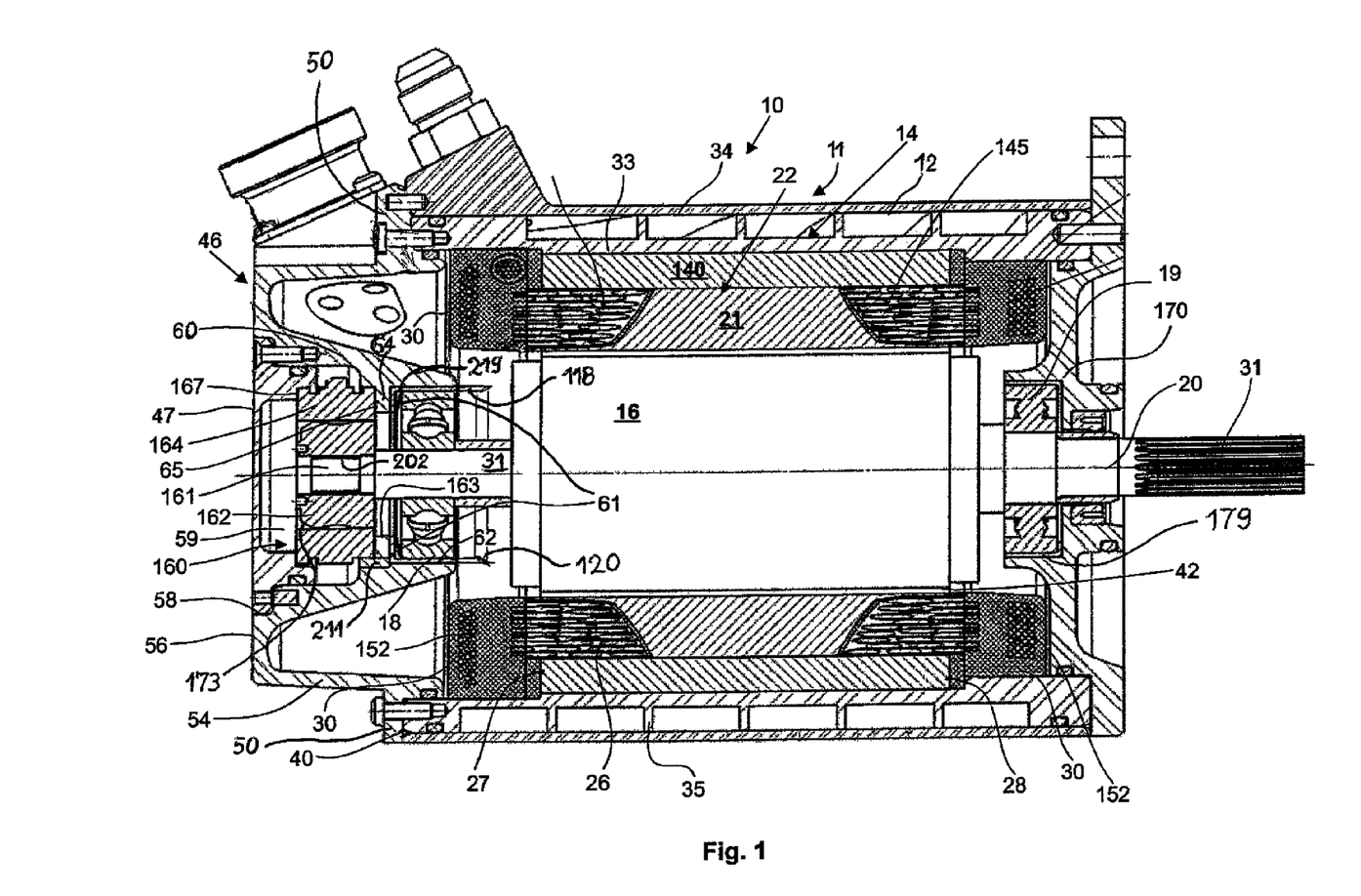
FIG. 1 represents, seen in section through an axial plane, an electrical machine according to the invention.

A synchronous electrical machine 10 shown in FIG. 1 comprises a jacket or casing 11 enclosing an external metal carcass 12 inside which are housed a stator 14 and a rotor 16 rotating in the stator about an axis 20 inside the stator. The rotor is mounted on a shaft 31 engaged in rolling bearings 18 and 19 axially spaced on either side of the stator. The stator 14 comprises a magnetic circuit 22 formed by a generally cylindrical stack 21 of magnetic metal sheets. The stack 21 is hollowed out by a series of peripheral notches 26 which run in a generally longitudinal direction between its two opposite axial end faces 27 and 28. In these notches 26 are housed copper conductors 145, each folded in a loop at the exit of a notch in one of the faces 27 or 28 in order to enter an adjacent notch in order to form a continuous electrical coil winding. All of the windings thus formed produce three coils suitable for being electrically connected in a star configuration to a power supply source or to a three-phase AC electrical-current using device, according to a well known installation for this type of machine. At each end of the stator 14, the assembly of loops formed by the conductors 145 exiting from the terminal faces 27 and 28 forms a "bun" 152 impregnated with resin in a respective terminal block 30 (FIG. 1).

A yoke 140 consisting of another cylindrical stack of metal sheets in the shape of circular rings surrounds the stack 21 and closes off the notches while ensuring the continuity of the magnetic circuit 22. The magnetic circuit 22 is pierced axially by a cylindrical channel designed to receive, with a calibrated air gap 42, the rotor 16. The latter consists of an assembly of permanent magnets not shown, prevented from rotating on the shaft 31. Attached to the shaft 31 on each side of the rotor is the internal race of one of the bearings 18 and 19, of which the external race is inserted, on assembly, into a supporting race, respectively 118 for the bearing 18 and 179 for the bearing 19, each secured to the casing 11 on either side of the stator 14.

The stator 14 installed in the casing 11 is housed in a portion of the carcass 12 forming a sheath in two coaxial sleeves, one internal 33 and the other external 34. In the internal cylindrical space of the sleeve 33 the yoke 140 of the magnetic circuit 22 is installed and prevented from rotating. FIG. 1 shows that the external radial face of the wall of the sleeve is furnished with helical ribs 35 which together form part of a circuit for the circulation of fluid for cooling the stator body.

The windings of the magnetic circuit 22 comprise connection conductors, not visible in FIG. 1, which exit from the notches 26 at one end of the magnetic circuit 22 situated on the left in FIG. 1 in this example, in order to be connected to the outside of the machine. On this same side, the sheath of the carcass 12 formed by the assembly of the sleeves 33 and terminates axially in an annular face 40 perpendicular to the axis 20 in an axial position in the vicinity of that of the ends of the blocks of resin 30.

FIG. 1 shows a hollow cap 46 bordered by an annular collar 50 that is bolted into the annular end face 40 of the sheath 33, 34 in order to close off one axial end of the casing 11. The cap 46 has a cylindrical wall 54 which connects the collar 50 to a terminal face 56 in the form of a circular ring in the centre of which a circular space 59 opens in the casing, normally closed by a removable cover 47 screwed into the cap 46. Starting from the internal radial edge of the face 56, the wall of the hollow cap 46 extends axially towards the inside of the machine through a flange element 60 of generally frustoconical shape. At its internal axial end (see also FIG. 5), this flange element 60 defines a housing delimited by an internal cylindrical wall 62 in which a race 118 which forms the supporting surface of the rolling bearing 18 of the rotor shaft 31. The race 118 is a sort of dish of which the cylindrical wall forms an internal radial elbow at one end in order to extend in a circular ring 121, with an opening 122 at its centre (FIG. 5). This ring is itself in external axial abutment against a lateral face 61 of an annular element 64 protruding into the internal radial wall 62 of the housing of the flange element 60. On the side opposite to the circular ring 121, the cylindrical wall of the race 118 protrudes slightly from the housing limited by the wall 62 and its internal wall terminates in a bevel 120 up to a ridge in the hollow space at the centre of the block of resin 30, facing one of the ends of the machine rotor, as is clearly visible in FIGS. 2 to 5.

Between the annular protrusion 64 and the axial end of the casing 11 on the side of the race 118 relative to the machine stator 14, the internal radial wall of the flange element 60 defines a housing of generally tapered shape towards the external axial end of the cap 46, which emerges into the space 59. Mounted in this housing is a resolver 160 comprising a rotor 162 attached to an extension 161 of the shaft 31 of the rotor, on the side of the rolling bearing 18 opposite to the machine rotor 16, and a resolver stator 164 of which the opposite radial faces are separated, in the operational position, by an air gap 242 (FIG. 1). The resolver stator 164 is immobilised axially between (i) the second lateral face, designated by the reference number 65, of the internal annular protrusion 64, opposite to the face 61 and turned towards the space 59, and (ii) a bearing surface 167 on the inside of the cover 47, around the central space 59, as shown.

As indicated above, the cover 47 is screwed into the end of the cap 46. A pin 211 prevents the stator from rotating in the flange element 60.

Between its two lateral faces 61 and 65

(FIGS. 1 and 5), the protruding annular element 64 is limited by the cylindrical surface of a bore 163 which is traversed in the assembled position by the extension 161 of the shaft 31 on which the rotor 162 of the resolver is mounted. The internal diameters of this bore 163 and of the aperture 122 at the centre of the ring 121 are greater than the external diameter of the rotor 162 of the resolver so as to allow the latter to pass through the ring and the protruding annular element 64 when it is extracted from its operational position in the stator 164 by moving the shaft 31 to the right of FIG. 1. It is therefore possible to take out the whole set of movable parts of the machine mounted on the shaft 31 through the end of the casing 11 opposite to the cap 46, if necessary, after having taken off the screws for attaching the flange 170 in the sheath 33, 34.

Therefore, in this example, the stator 164 of the resolver 160 is immobilised both in rotation and in the axial direction in the casing of the machine. On the other hand, the rotor of the resolver 160 is secured to the shaft 31 of the rotor 16 in an adjustable angular position, determined during an initial adjustment or calibration operation, which serves as a reference for transmitting, at every moment, an item of information to the system for controlling the electrical machine on the angular position of the rotor of this machine in its stator, according to the known operating principle of automatically controlled three-phase synchronous machines.

The machine shaft 31 comprises, at the end of its extension 161, a shoulder 166 turned towards the outside relative to the machine rotor against which the axial face 168 of the resolver rotor 162 (see FIG. 5) turned towards the machine rotor is pressed. Between this shoulder and its free end, the shaft 31 has a male supporting surface about which is mounted a friction ring 202 for example with a spring. The resolver rotor 162 is pierced with a central bore 206 which is engaged on the said supporting surface at the end of the shaft extension 161, about the friction ring 202. The external radial face of the ring 202 exerts a friction torque on the rotor 162 that is sufficient to prevent it from rotating relative to the shaft 31 in normal operation of the machine. However, the friction forces of the friction ring 202 can be overcome for reasons of adjustment when a sufficient differential torque is applied, for example with the aid of a tool specially provided for this purpose. In this respect, the terminal face 221 of the resolver rotor, at the end of the shaft extension 161, is furnished with two small blind holes 209 and 210 forming a gripping means by virtue of which a tool, not shown, comprising two pins suitable for being engaged in the two blind holes, can be coupled with the rotor 162 in order to rotate it for the purposes of adjusting its angular orientation on the machine shaft 31. An exemplary embodiment of this method for adjusting the resolver in a rotating electrical machine is described in detail in the aforementioned International Patent Application No. WO 2010026159.

Before assembly of the machine, certain elements of the machine stator have been installed in the casing and a resin impregnation has made it possible to consolidate and insulate the assembly. The user has a stator preassembly, including the cap 46, but not the flange 170. Moreover, the rotor has also been preassembled and the shaft 31 of the rotor 16 is inserted into the flange 170, which gives another assembly of preassembled elements. This other assembly is engaged in the stator preassembly. Initially, the rotor tends to stick to the stator by magnetic attraction, as long as the bearing 18 is not centred on the race 118. The bearing 18 thus put in place is fully engaged in the race 118 mounted in the aperture 62 of the flange element 60. The conductors for connection of the stator of the machine are connected to connectors towards the outside. The end of the extension 161 of the shaft 31 of the machine rotor after having passed through the central apertures 122 and 163 in the flange element 60 enters the space that is radially delimited by the internal radial wall of this flange 60. Then the cap is attached to the end of the sheath 33, 34) by its collar. The end of the shaft extension 161 then protrudes into the central space 59 that is still open in the cap 46. In this example, the rotor 162 of the resolver 160 can then be installed by forcing the internal bore 206 of the rotor 162 about the friction ring 202 until the face 168 butts against the shoulder 166. The stator 164 is then installed in its housing against the lateral face 65 of the protruding annular element 64 and prevented from rotation with a pin 211. FIG. 1 illustrates the assembled electrical machine.

Before completely closing the cap 46 by installing the cover 47 and completely immobilising the resolver stator in the axial direction, the angular position of the resolver rotor 162 is adjusted by a set of tests, by having the rotor rotate as has been explained to a position that can then be maintained throughout the period of use of the machine by the friction torque effect applied by the ring for attaching the resolver rotor to the end of the shaft 31.

It is noted that, once this operation is completed, the arrangement described here makes it possible to carry out certain interventions, such as maintenance operations, for example, by extracting the shaft 31 from the casing (FIG. 1) on the side where the machine is closed by a flange 170 screwed onto the other terminal face of the sheath 33, 34, and in which the supporting surface 179 of the rolling bearing 19 of the shaft 31 is arranged. The removal of the flange 170 makes it possible to separate the rotor from the stator and to release the right portion of the shaft 31. The machine shaft 31 can then be extracted from the casing 11 to the right in FIG. 1 while bringing with it the resolver rotor 162 secured to the extension 161 of the shaft 31. During this movement, the resolver rotor 162 passes through the bore 163 of which, as has been seen, the internal diameter is greater than its own, and the bearing 18 is extracted from the race or cup 118, while the machine rotor 16 is disengaged from the stator 14.

When the movable portions of the machine are reinstalled inside the casing 11, in which the counter-part fixed portions are already attached, the process begins by inserting the left end of the machine shaft 31 (seen in FIG. 1) onto which have been inserted all the elements that form the equipment 300 (FIG. 2A to 4A) that can rotate during the operation of the machine. These are, in addition to the resolver rotor 162 and the machine rotor 16, the rotary ball bearing 18 which has a ball cage secured axially to the rotor 16 and of which the external radial portion is inserted when installed in the supporting race 118. At this point, the shaft 31 has reached the limit of its travel inside the casing 11 and all the elements that are attached thereto must have finished entering the spaces provided for them inside the casing 11. It is worth-while to note that, in this situation, the resolver 160 retains the angular position corresponding to the adjustment initially made during the first assembly by the operation previously described. The installation and the removal can be reiterated without destroying the angular immobilisation between the two rotors. This makes it possible to save substantial adjustment time on reassembly.

According to an important aspect of the invention, provision is made to particularly make the installation or reinstallation operation easier by a judicious arrangement of the functional parts aligned along the shaft inside the machine. By examining Figure it is possible to see that the distance D1 that separates the positions along the axis of the said shaft 31, from the point or from the ridge 219 for engagement of the rotary bearing 18 in the corresponding supporting race 118 and from the ridge 263 of which the diameter is at its maximum in the external radial wall 262 of the resolver rotor 162 on the side of its free end, is smaller than the distance D2 that separates the positions, located axially in the casing 11, from the point or from the engagement ridge 119 of the supporting surface 118 by the rotary bearing 18 and from the plane 265 that axially limits the internal radial wall 165 of the resolver stator 164 on the side of the machine stator 14.

For more precision with respect to D1, the point or ridge 219 for engagement of the rotary bearing 18 is defined as being the circular point or ridge of the external radial wall 218 of the bearing 18 that is most advanced on the side of the free end of the extension 161 of the shaft 31 and, consequently, that is the first to come into contact with the inside of the race 118 during the longitudinal movement of the shaft 31 in the casing 11. The plane 263 at the free end of the resolver rotor 162 is the plane that axially limits the resolver air gap 242 at the corresponding end of the external radial wall 262, or the plane limiting the sector of the external radial wall of which the diameter is at its maximum on the side of the free end of the said rotor 162. For more precision with respect to D2, the point or ridge of engagement 119 of the supporting surface 118 by the rotary bearing 18 is the point or the ridge of engagement of the internal radial wall (bevel 120) of the race 118 that is furthest away longitudinally from the end of the casing 11 that is situated on the same side as the passageway 163 for the shaft extension 161 and, consequently, that is the first to be contacted by the rotary bearing 18 during the longitudinal movement of the shaft 31 in the casing 11 on assembly; the plane 265 at the entrance 265-1 of the resolver stator 164 is the plane that axially limits, in the assembled position, the resolver air gap 242 in the internal radial wall 165 of the resolver stator 164 on the side of the machine stator 14.

Thus, when, on reassembly of the machine, the shaft 31 is moved inside the casing 11 to bring the movable parts into their respective operating positions, the external axial face 218 of the rotary bearing 18 reaches the plane of the aperture (bevel 120) on entering the race 118 in a longitudinal position of the machine shaft that is offset relative to the position of the same shaft in which the external axial face 262 of the resolver rotor 162 reaches the entrance 265-1 of its housing in the corresponding stator 164. Yet more specifically, in the example given, the external axial face 218 of the rotary bearing adjoins the entrance (bevel 120) of the bearing supporting race 118 before the moment when the external axial face 262 of the resolver rotor 162 reaches the entrance 265-1 of the stator 164. The resolver rotor 162 therefore remains sheltered from the contacts and the impacts with its environment when the bearing 18 is inserted into the race 118 which requires a prior operation of centring the shaft 31 on its axis 20 in order to be able to precisely engage the face 218 of this bearing in its supporting race 118. The distances D1 and D2 are chosen to leave a sufficient longitudinal clearance to make it possible to carry out this radial centring of the rolling bearing 18 at the entrance of the supporting surface 118 before the axial end 263 of the sector of maximum diameter in the external radial wall 262 of the resolver rotor reaches the entrance 265-1 of the resolver stator.

With reference to FIG. 5, it can be seen that the internal radial wall (bevel 120) which leads to the entrance of the aperture 120-1 of the race 118 is bevelled. Its internal diameter narrows towards the inside of the race until it coincides with the external diameter of the bearing 18 that is inserted therein with a minimum clearance in the final position. Thus, when the shaft 31 is gradually inserted, on installation in the casing 11 from its aperture that is left free at the right end of FIG. 1 in the absence of the flange 70, the external axial cylindrical wall 218 of the bearing 18 reaches the entrance plane of the aperture 120-1 after the rotor 16 has already occupied a substantial portion of the space inside the stator 14, shortly before reaching its definitive position which delimits the air gap 42. By virtue of the bevelled profile at the entrance 120-1 of the race 118, the wall 218 can begin to enter this race, even though the shaft 31 is slightly off centre relative to the axis 20. The bevelled internal wall of the aperture 120 acts as a centring surface or cam relative to the bearing that continues its penetration, notably against possible transverse magnetic forces exerted, during the insertion phase, by the magnetised portions, on either side of the air gap 42 in formation, between the rotor 16 and the stator 14 of the machine. From the centred position when the ridge 219 of the bearing reaches the point or ridge of engagement 119 in the race 118, these forces tend to be neutralised and the external surface 218 of the bearing 18 continues its penetration by sliding into the supporting race 118 until it butts against the ring 121 at the back of this race 118.

In this example, the length of the bevelled surface at the entrance of the aperture 120 may be a few millimetres for example. It is determined so as to leave at the external axial face 218 of the bearing 18 a sufficient longitudinal travel to achieve a correct centring before the ridge 263 at the end of the external cylindrical wall 262 of the rotor 162 of the resolver 160 reaches the entrance 265-1 of the stator cavity in a correct position of alignment. From the point of axial coincidence of the rotor ridge 263 and stator ridge 265-1 of the resolver, the movable equipment brought by the machine shaft 31 continues its axial course up to the point where its axial face of the bearing 18 limited by the ridge 219 is stopped by the ring 121 at the back of the race 118. At this point the assembly is complete and the resolver air gap 242 is completely defined by the opposite radial faces of the rotor and of the stator. The distance over which the shaft 31 continues its course before the resolver rotor reaches the entrance of the resolver stator is determined by the difference in the distances D1 and D2. In the situation described, it may be of the order of one or two millimetres, for example. This prevents any contact between the resolver rotor 162, which is relatively fragile, and its environment in the casing 11 during the phase of inserting the shaft 16 into the latter. Observing this example shows that the resolver rotor 162 has a frustoconical contour 173 starting from the ridge 263 at the end of the cylindrical external radial wall 262 to the free end of this rotor. It is an arrangement provided by the manufacturer of the resolver.

Figure 2A:
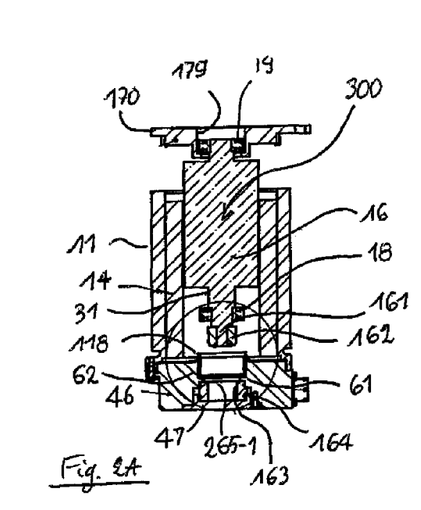
FIGS. 2A, 3A and 4A illustrate three successive steps of the reassembly of the movable portions into the fixed portions of this machine after a removal, according to the progression of the shaft of the machine inside its casing.

In summary, FIGS. 2, 3 and 4 make it possible to clearly understand the embodiment of the invention and its operation based on a schematic representation of the machine and of its various components. In FIG. 2, movable equipment 300 comprises the shaft 31 and the rotor 16 of the machine, shown in a single unit, with on the side of one of its ends the rotor 162 of the resolver 160 secured to the end of the extension 161 of the shaft, and the bearing 18, mounted on this shaft between the rotor 162 and the machine rotor 16. Mounted on the other side of the equipment 300 is the second bearing 19 with its outer race centred in a supporting surface 179 in a flange 170 designed to close off the corresponding end of the casing 11.

Recognised in this casing 11 is the stator 14 and the closure cap 46 in which is arranged the space 59 that is axially open outwards and in which is housed the stator 164 of the resolver 160. This space 59 is closed off at its external axial end by the cover 47 so as to immobilise the stator 164 in position against a lateral face 65 of the radially protruding annular element 64. The internal face of this annular element 64 consists of the bore 163 of which the diameter is greater than the external diameter of the resolver rotor 162. The opposite lateral face 61 of the protruding annular element 64 forms the back of a cylindrical housing 62 formed in the cap 46 in order to accommodate the race 118 for supporting the bearing. In this schematic representation it can be recognised that the cap part 46 and its internal extension, which in FIG. 1 forms the frustoconical flange 60 for supporting the bearing supporting surface 18, are not individualised here.

Figure 2B:
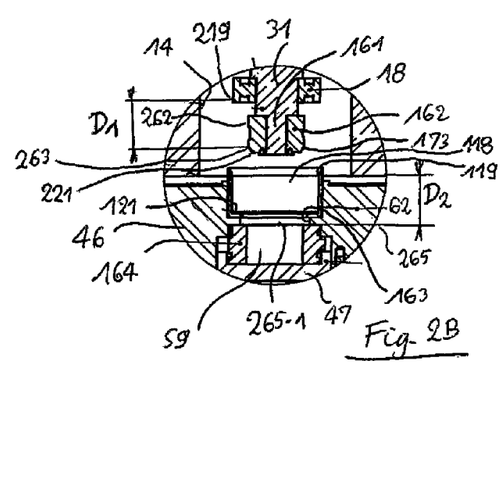
FIGS. 2B, 3B and 4B each represent respectively an expanded or magnified view of the parts in contact during the assembly steps of FIGS. 2A, 3A and 4A.

In the position illustrated by FIG. 2A, the movable equipment 300 is only partially inserted into the casing 11. The bearing 18 and the resolver rotor 162 secured to the extension of the shaft 31 are still in the cavity inside the machine stator 14 on the side of the end of the casing 11. FIG. 2B, which is a magnified view of this end, (with the aid of the reference numbers of FIG. 5) clearly shows the respective positions of the movable equipment and the race 118 butting against the face 61 of the protruding annular element 64 and ready to receive the bearing 18, while the resolver stator 164 is secured to the other side of this protruding annular element of which the cylindrical wall defines the bore 163 (FIG. 5).

Figure 3A:
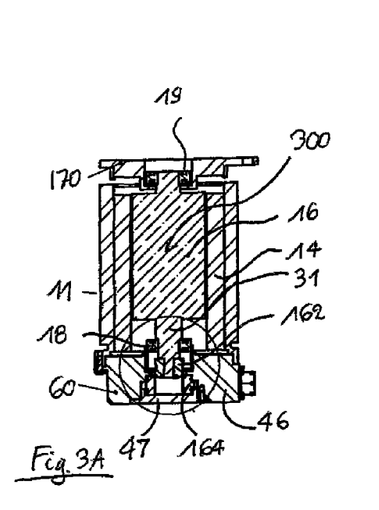
Figure 3B:
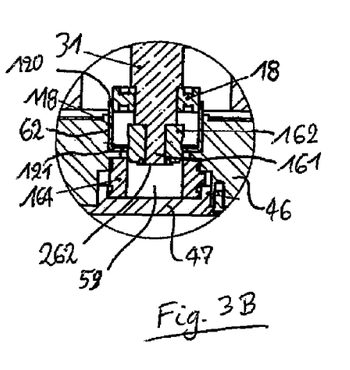

FIGS. 3A and 3B illustrate the respective positions of the movable equipment 300 and of the parts inside the casing 11 at the time of the travelling of the shaft 31 where the bearing 18 has begun to enter the race 118. FIG. 3B shows that the internal profile 120 of this race has a slightly reducing diameter at the aperture which has made it possible to remove the radial clearance between the external side of the bearing 18 and the internal side of the race 118 and to precisely centre the machine shaft on the axis 20 during the beginning of the phase for engaging the bearing 18 in the race 118. It can also be seen that, in the position shown in FIG. 3B, the external end face 262 of the resolver rotor has just reached into the plane 265 of the entrance aperture 265-1 of the internal cavity of the resolver stator 164 and in position of alignment in order to enter the said cavity without damage. There is therefore an offset between the longitudinal positions of the shaft 31 at the time of engagement of the bearing 18 in its supporting race 118 and of the entry of the end of the resolver rotor 262 into the cavity of the stator 164. While the shaft covers the distance of this offset, at least in part, the bearing 18 is progressively centred in the race 118 and the counterpart portions of the resolver are aligned mechanically in order to reach a position in which they can then be engaged into one another without damage.

Figure 4A:
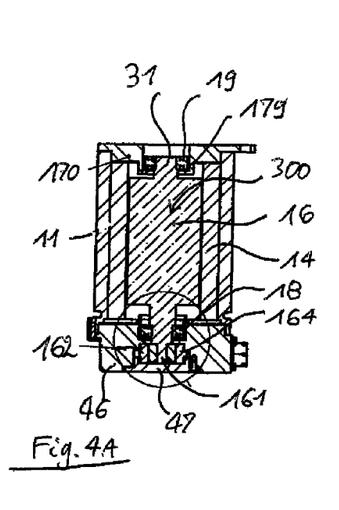
Figure 4B:
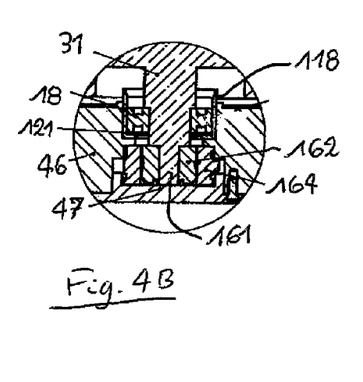
Figure 5:
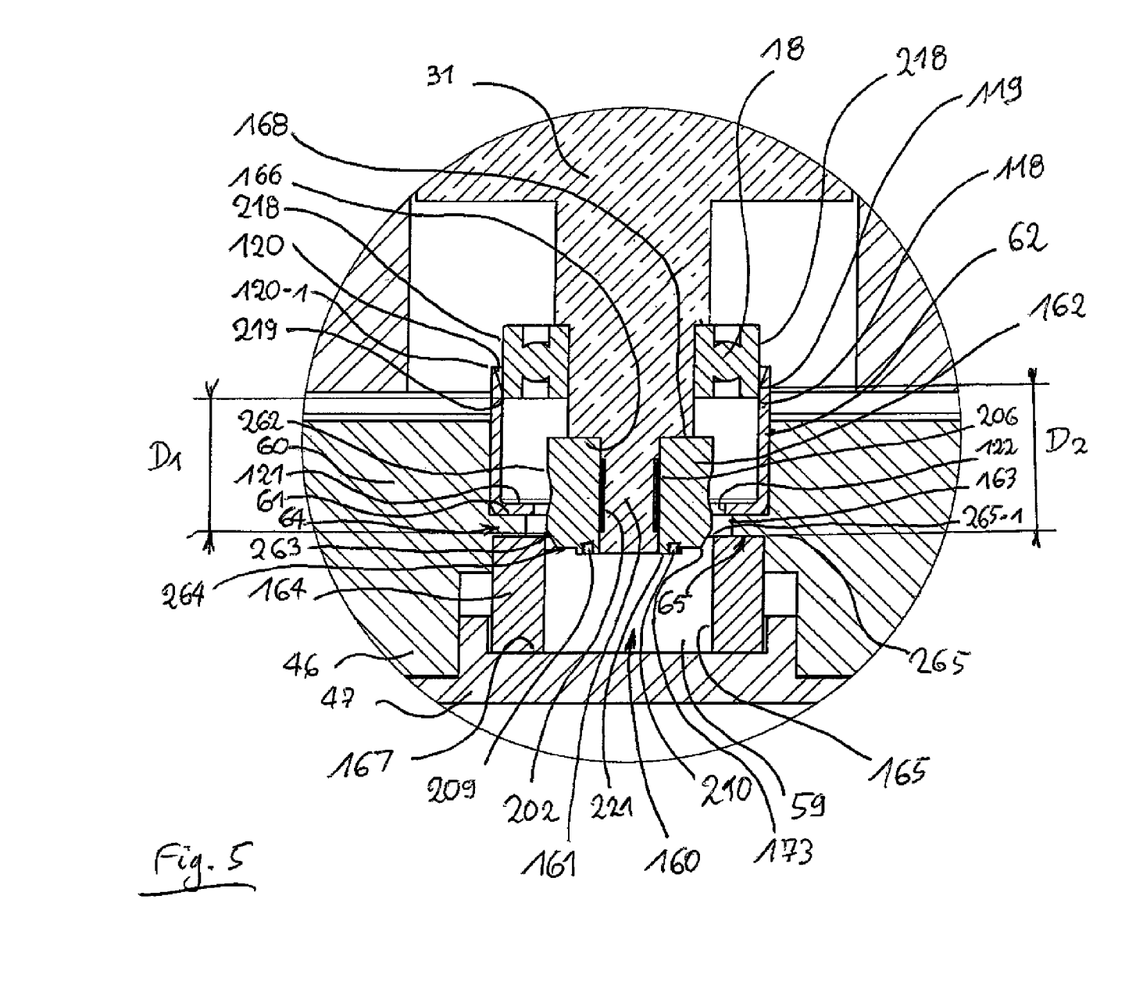
FIG. 5 is a greatly enlarged view of FIG. 3B.

FIGS. 4A and 4B show the elements of the previous two figures after the movable equipment 300 has completely entered the casing 11. The flange 170 is in position for attachment at the end of the casing 11 in order to attach the bearing 19 in its supporting surface 179. The rotor 16 of the machine is housed inside the stator cavity. The bearing 18 is completely inserted into the supporting race 118. The rotor 162 of the resolver is in place inside the stator cavity which it had begun to enter at the end of the travel from the face 218 of the bearing 18 along the bevel 120 of the race 118.

The invention is not limited to the example described and shown above and notably to the method for adjusting the resolver that is used here as a non-limiting example to illustrate the invention. In particular, it may equally apply in the case in which the adjustment of the resolver is carried out from a resolver rotor secured by construction to the machine shaft, with a resolver stator of which the attachment in the casing comprises a device making it possible to adjust the angular position of the stator relative to the rotor after these elements have been put in place on assembly. The invention therefore finds an application in all cases in which the organisation of the inside of the machine allows the insertion into the casing of a movable equipment supporting all the parts driven by the shaft from a single side of this casing and in which this facility is useful for making the installation or reinstallation of the rotating electrical machine easier. Other modifications may be made to the arrangements described in the example without departing from the context as defined by the appended claims.

The invention claimed is:

1. A rotating electrical machine comprising:
   a casing;
   a machine stator attached to the casing;
   a machine rotor positioned in the machine stator on a machine shaft, the shaft defining a rotation axis of the machine, wherein the machine shaft is mounted on one side of the machine rotor, in a rotation bearing secured axially on the machine shaft and centered in a bearing surface connected to the casing, and wherein the machine rotor is insertable into the casing by a relative movement between the machine stator and the machine rotor parallel to the rotation axis of the machine;
   an internal passageway in the casing, the internal passageway being traversed by an extension of the machine shaft beyond the rotation bearing;
   a resolver including a resolver rotor having an external diameter that is smaller than a diameter of the internal passageway, wherein the resolver rotor is attached to the extension of the machine shaft and is insertable into a cavity of a resolver stator via the relative movement, such that when the resolver rotor is inserted into the cavity of the resolver stator a resolver air gap is present between radial walls facing the resolver rotor and the resolver stator; and
   a centring interface between the rotation bearing of the machine shaft and the supporting surface in the casing, wherein a distance D1, measured along an axis of the machine shaft, between a first position (i) of an engagement point of an external radial wall of the rotation bearing with a supporting surface in the casing, the first position (i) being most advanced towards a free end of the extension of the machine shaft, and a second position (ii) of a point or ridge of a sector of maximum diameter in an external radial wall of the resolver rotor, the second position (ii) being most advanced towards the free end of the extension of the machine shaft, is less than a distance D2, measured axially in the casing, between a third position (i) of an engagement point of an internal radial wall of the supporting surface with the external radial wall of the rotation bearing, the third position being most advanced in a direction of the machine stator, and a fourth position (ii) of a point or ridge of a sector of minimum diameter in an internal radial wall of the resolver stator, the fourth position being most advanced in the direction of the machine stator, wherein the external radial wall of the bearing, on a side corresponding to the free end of the extension of the machine shaft, has a first sector suitable for coming into contact with a second sector in the internal radial wall of the supporting surface of the rotation bearing on a side corresponding to the machine stator in the casing, and wherein at least one of the first and second sectors is profiled with a diameter that decreases axially in the longitudinal direction going from the machine rotor and the machine stator to the resolver.

2. The rotating electrical machine according to claim 1, wherein, in the second sector, the internal radial wall of the supporting surface of the rotation bearing has a diameter that decreases axially in the longitudinal direction going from the machine rotor and the machine stator to the resolver.

3. The rotating electric machine according to claim 1, wherein a space that is internal to the supporting surface of the rotation bearing in the casing is limited axially on a side opposite to the machine stator by an abutment that is crown-shaped around the internal passageway traversed by the machine shaft, the internal passageway having an internal diameter that is greater than the external diameter of the resolver rotor and less than a diameter of the external radial wall of the rotation bearing.

4. The rotating electric machine according to claim 2, wherein a space that is internal to the supporting surface of the rotation bearing in the casing is limited axially on a side opposite to the machine stator by an abutment that is crown-shaped around the internal passageway traversed by the machine shaft, the internal passageway having an internal diameter that is greater than the external diameter of the resolver rotor and less than a diameter of the external radial wall of the rotation bearing.

* * * * *